C. P. BYRNES.
REVERSING VALVE.
APPLICATION FILED DEC. 9, 1905.
1,089,690.
Patented Mar. 10, 1914.
4 SHEETS—SHEET 1.
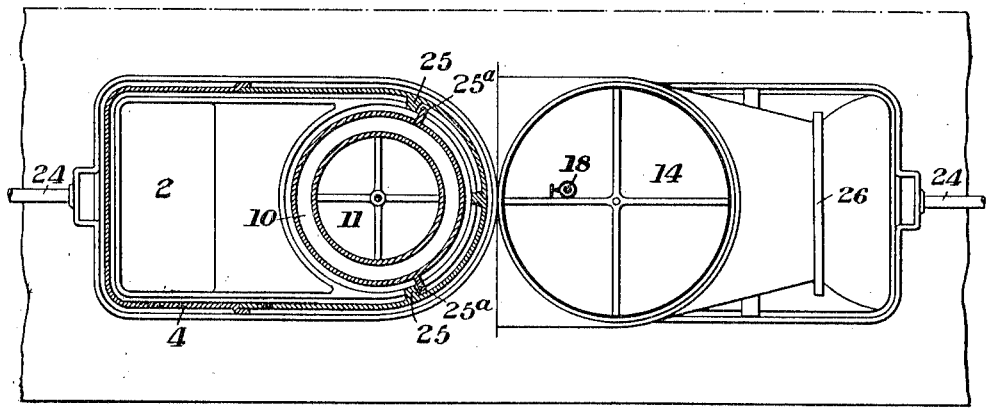
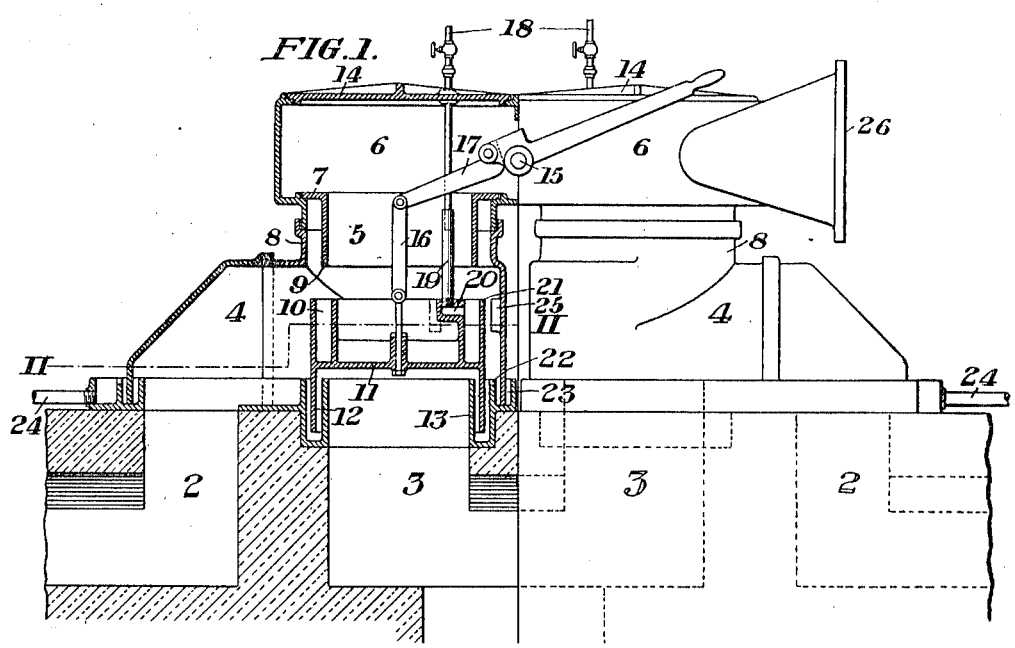
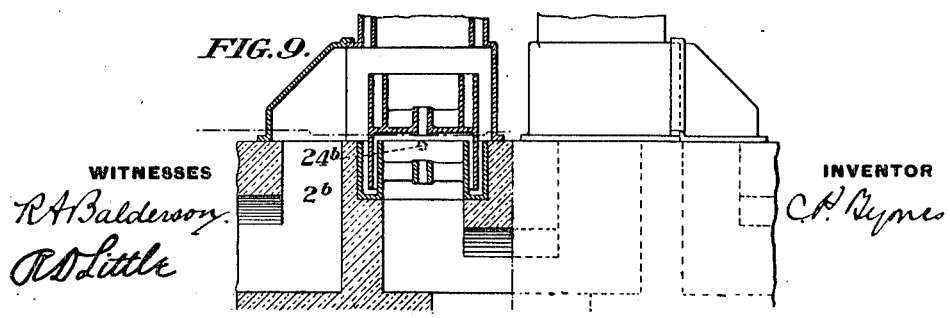
WITNESSES
R. A. Balderson
R. D. Little
INVENTOR
C. P. Byrnes

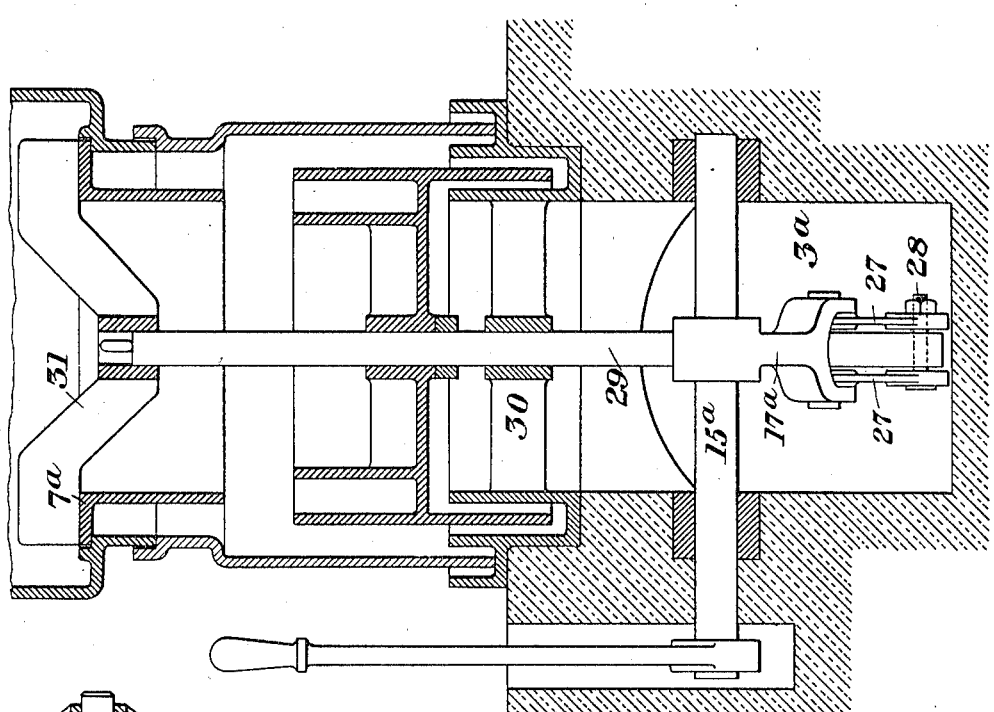
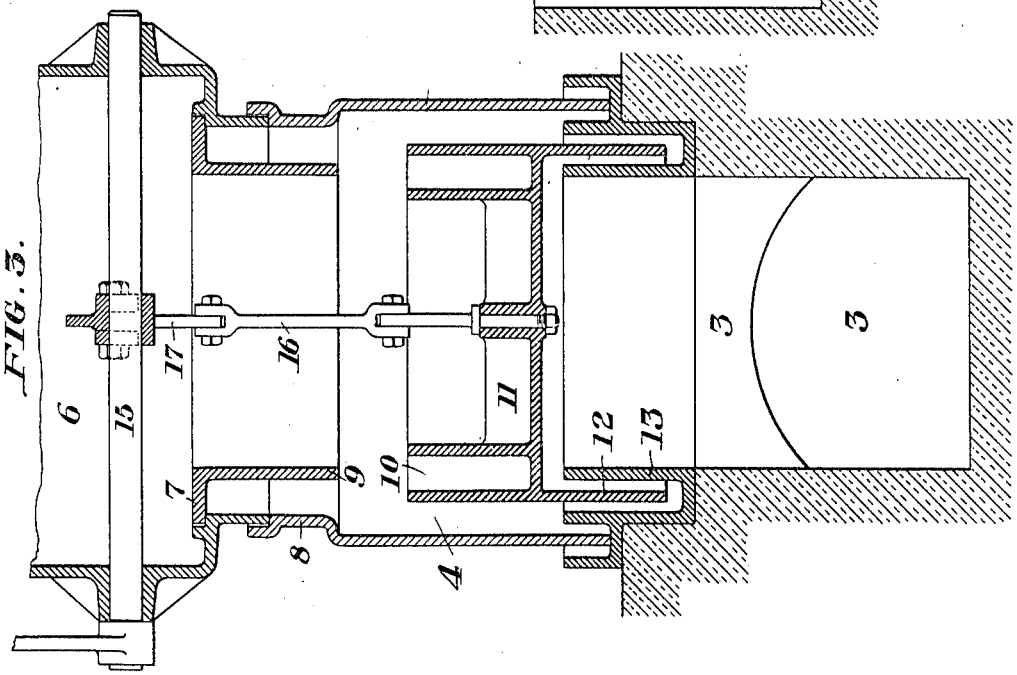

C. P. BYRNES.
REVERSING VALVE.
APPLICATION FILED DEC. 9, 1905.

1,089,690.

Patented Mar. 10, 1914.
4 SHEETS—SHEET 3.

WITNESSES
R. A. Balderson.
R. D. Little

INVENTOR
C. P. Byrnes

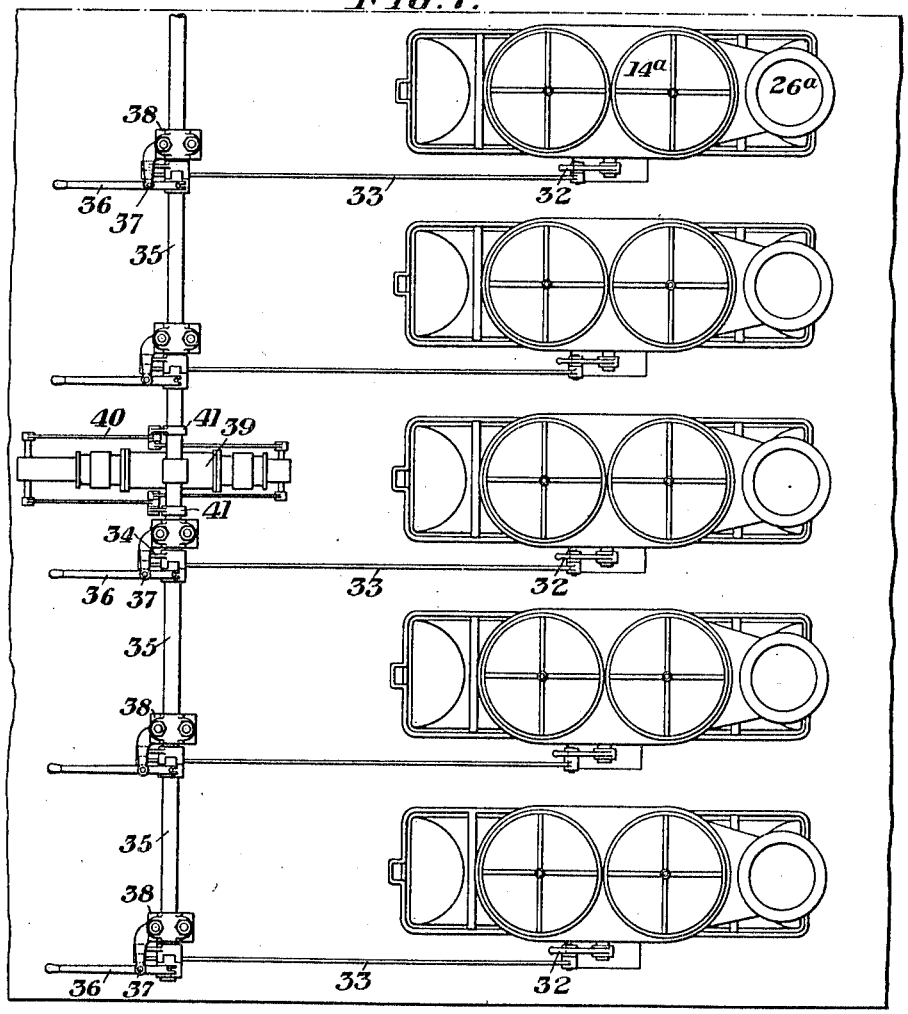
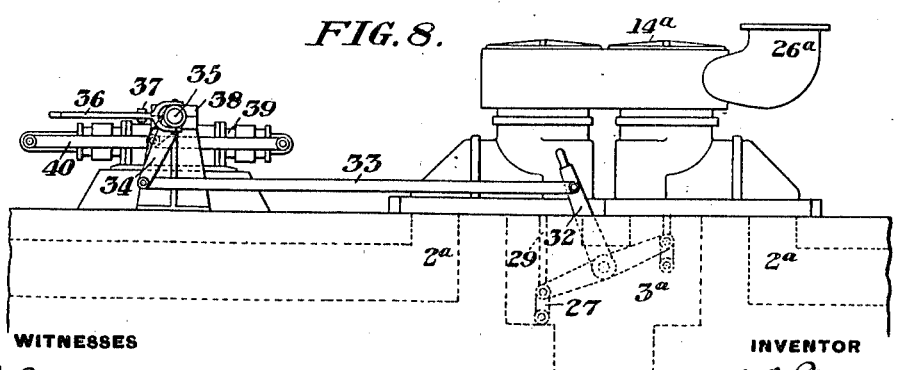

UNITED STATES PATENT OFFICE.

CLARENCE P. BYRNES, OF EDGEWORTH, PENNSYLVANIA.

REVERSING-VALVE.

1,089,690.  Specification of Letters Patent.  Patented Mar. 10, 1914.

Application filed December 9, 1905. Serial No. 291,101.

*To all whom it may concern:*

Be it known that I, CLARENCE P. BYRNES, of Edgeworth, Allegheny county, Pennsylvania, have invented a new and useful Reversing-Valve, of which the following is a full, clear, and exact description, reference being had to the accompanying drawings, forming part of this specification, in which—

Figure 5:
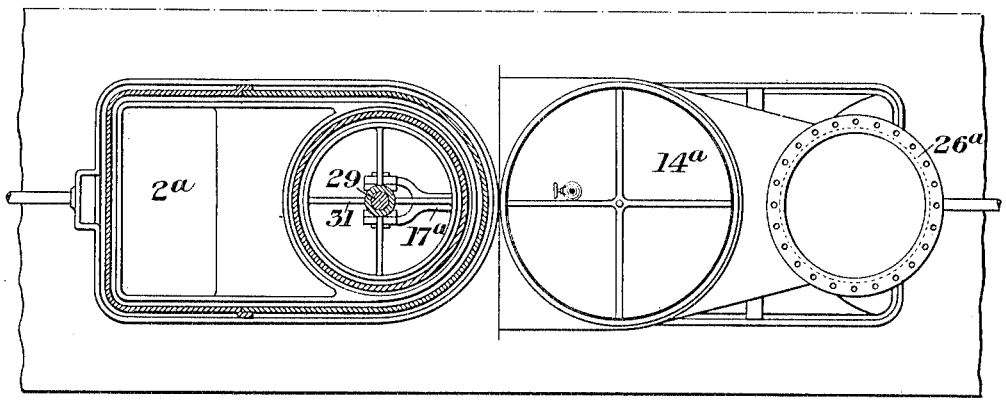
Figure 4:
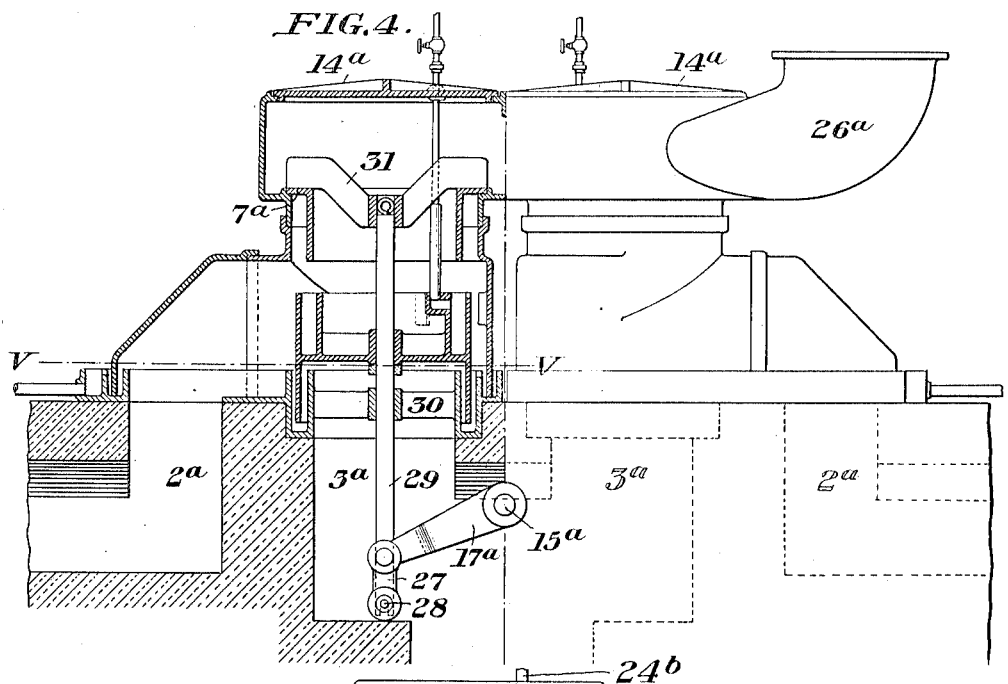
Figure 10:
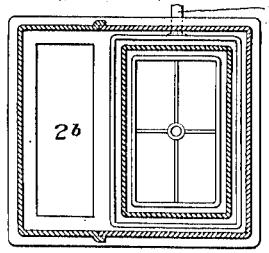

Figure 1 is a side elevation partly broken away, showing one form of my improved valve; Fig. 2 is a top plan view of the same partly on the line II—II of Fig. 1. Fig. 3 is a cross-section of this form taken through one of the stack flue openings; Figs. 4, 5 and 6 are views similar to Figs. 1, 2 and 3, respectively, showing another form of the invention; Fig. 7 is a plan view of a series of valves arranged to be operated from a common connection, where desired; Fig. 8 is an end elevation of Fig. 7; Fig. 9 is a vertical side elevation of a further form; and Fig. 10 is a horizontal cross-section of the form of Fig. 9.

My invention relates to the class of reversing valves for regenerative furnaces and the like, and particularly to the valve of my Patent No. 723,582, granted on March 24th, 1903, for water-cooled valve.

The invention relates more especially to the details of construction, and is designed to simplify and improve the structure and lengthen its life. The invention is also designed to provide for simultaneous operation of a series of reversing valves, when desired, provision being made for severing the connection between any valve and the common operating means, when such is desired.

In the drawing, referring to the form of Figs. 1, 2 and 3, 2, 2 indicate the regenerator ports, and 3, 3 the ports which lead to a common stack flue. In this form the system is therefore a duplicate form of the two-port system, and the ports 3, 3 may constitute a division of the stack port of the three-port system; or for new furnaces the ports may be built in fours as shown. These ports all enter the common boxes 4, which may be of the form shown at the left-hand of Fig. 2.

The boxes 4, 4 are provided with ports 5, 5 leading upwardly into the common gas supply box 6. The port 5 is formed within a ring-shaped casting 7 hanging on the wall of a top-hole in the box and having a depending flange 9 which is spaced apart from the wall of the casting 8. This flange 9 is arranged to enter the annular liquid well 10 of the vertically moving valve 11. This valve 11 is also provided with a depending annular flange 12 which enters the annular water-seal 13 surrounding the stack port 3, when this stack port is closed.

The top of the gas box 6 is provided with removable covers 14, which fit over holes of larger diameter than the casting 7. This allows the casting 7 to be lifted upwardly through the hole, through which the valve also may be lifted out. The pair of valves which thus control the currents of gas and products are preferably supported so as to counterbalance each other. Thus, I show a shaft 15 pivoted within the sides of the gas box and having link connection 16 with the central stem of each valve. In order to facilitate the removal of the valves, I preferably make the rock arm 17 as a right-angled arm which is pivoted to a lug on the rock shaft 15. The lug and lever 17 have flat interfitting faces, so that during the operation of the valve there is no relative movement; but by taking out the pin connection the lever 17 can be lifted with the valve, thus facilitating removal.

In order to avoid supplying water to the valve through its stem, involving the use of flexible hose or jointed pipe, I preferably provide the valved water-inlet pipes 18, which extend through the covers and down within the flange 9. The end portion of this pipe is surrounded by the telescope pipe section 19, the lower end of which is screwed into a pocket extension 20 on the inside of the valve proper, which is cored to connect with the well 10 of the valve. This pipe is preferably placed near the inner end of the valve; that is, that portion which is adjacent to the next valve; and the well is preferably cut down or notched somewhat in this portion, as shown at 21, so that the overflow from the valve well into the water seal will be localized in a portion distant from the path of gas flowing to the regenerator flue. It will be seen from Fig. 1 that with the left-hand valve closing the stack flue, the water flows down through pipes 18 and 19 into well 10 and then overflows through notch 21 into the water seal 13. I have also shown the water seal 13 as notched at 22 to overflow into the water seal 23 for the general box, and which is provided with the outlet pipe 24. This water seal for the box may or may not be used as desired, the water being tapped out from the lower water seal through a pocket at one side extending under the box wall, if the box seal is not used.

In order to guide the valve during its vertical movements, I preferably provide the projections or ribs 25 on the inside of the box, and the lips or ears 25$^a$ on the valve which will limit swinging of the valve and reduce liability to canting or side movement, which might otherwise allow it to take non-registering positions. The gas is preferably led into the upper box through the supply 26.

Each valve proper is so arranged as to depth of well and flange, that in its upward movement the flange 9 will enter the seal 10 before the depending flange 12 has left the seal 13. The gas supply is thus cut off to the regenerator before the regenerator is opened to the stack. This is, of course, the case with both valves, the system being in duplicate.

In Figs. 4, 5 and 6 I show a similar form, except that the gas nozzle 26$^a$ is provided with a vertically extending outlet and the shaft 15$^a$ is located in the connection between the two stack ports 3$^a$, 3$^a$. In this case, the rock arm 17$^a$ is provided with links 27, which connect to a short shaft 28 receiving the forked end of the valve stem 29. This valve stem extends through the spider guides 30 and 31 and is secured to the valve body in any suitable manner. In this case the valve can be lifted out merely by removing the cover 14$^a$, since the valve stem has the forked lower end. The skeleton guide 31 is preferably formed as a part of the casting 7$^a$, though it may be made separately, if desired. In this case, the regenerator port is marked 2$^a$.

In the use of a series of regenerative furnaces, such as an open hearth furnace, it is found difficult to insure the reversing of the gases at the proper intervals of time, owing to neglect of the operators. Each furnace has heretofore been independent of the others in this regard.

I have shown the stack ports as circular in cross-section, while the regenerator ports are rectangular. Both sets of ports may, however, be made rectangular as shown in Figs. 9 and 10, and this would be preferable in some cases, since thereby the size of the box may be slightly reduced in height. In such case, the inner end portion of each box 2$^b$ is substantially square instead of semi-circular, and the valves and gas inlet ports are of rectangular shape instead of cylindrical as shown. In this form I show the water as being tapped out from the lower water seal through the outlet pipe 24$^b$.

A further feature of my invention consists in connecting a series of these reversing valves to a given shaft or operating means, with means for severing the connection whenever desired. In this manner the common shaft or actuating mechanism, may be operated at the desired intervals of time, thus insuring the reversal of all furnaces whose valves are connected therewith. At the same time any valve connection may be severed from the operating means and may be operated by hand or otherwise independently if desired. Thus, in Fig. 7, I show a series of valves like my second form whose hand levers 32 are provided with pivoted links 33 connected to rock arms 34. Each of these rock arms is loosely mounted on a rock shaft 35, and may be connected with the shaft or disconnected therefrom, by means of a clutch actuated by clutch lever 36. This clutch lever may be pivoted at 37 on a bracket extending from the bearing 38 for the rock shaft 35.

The shaft 35 may be rocked by any suitable means, and I have shown for this purpose a double-acting cylinder 39 having a yoke connection 40 with rock arms 41 secured to the shaft. With this arrangement it is obvious that when the shaft 35 is rocked by actuating the power cylinder, the valves of all furnaces will be reversed so far as connected to the rock shaft. If any furnace is not in operation, or for any reason it is desired not to reverse its valve, the clutch connection may be severed, and such valve may then be operated independently by its hand lever. Furthermore, the clutch connection affords means for changing the angular position of one valve-operating lever relative to another so that the positions of each valve may be adjusted relative to the others to regulate the flow of the gas or air to the different furnaces.

The advantages of my invention result from the simplifying and cheapening of the structure; the reduction in size, and lengthening of the life. As to the second feature of the invention, which may or may not be used with the particular valve shown, the advantages are obvious, since the furnaces are reversed without depending upon the particular workman operating any individual furnace.

The ports may be made rectangular or cylindrical, or of any other desired form in cross-section, though they are preferably rectangular, at least in part, since this tends to reduce the size of the valve-box system. The valve and the box part may of course be made of either castings or plates.

The water-seal for the general boxes may be done away with, and many other variations may be made without departing from my invention.

I claim:—

1. The combination with a series of separate furnace chambers, of sets of reversing valves controlling the flow of gases separately to each chamber, said valves being connected in pairs, means for operating the several pairs of valves, and separable connections between each pair of valves and the common operating means, to permit any pair to be thrown out of operation with the others or to permit its operation independently of said others substantially as described.

2. In a reversing valve, a vertically movable water-cooled valve having upper and lower sealing troughs arranged to make a seal at one end before breaking it at the other end, means for moving the valve vertically, and guides arranged to limit the swinging or sidewise movement of the valve; substantially as described.

3. In a reversing valve, a vertically movable water-cooled valve having connections to a rock shaft, and guides arranged to limit swinging or sidewise movement of the valve; substantially as described.

4. The combination with a series of regenerative furnaces having supply and offtake ports connected with regenerators, of a series of reversing valves arranged in pairs and controlling the flow of the gases to said furnaces, an operating shaft common to all, and severable connections between each pair of valves and said shaft to permit any pair to be thrown out of operation with the others or to permit its operation independently thereof; substantially as described.

5. In reversing valve systems, a series of separate furnace chambers, sets of reversing valves for each chamber, a common operating shaft, means for rocking said shaft, and a severable link connection between said shaft and the valve-operating mechanism of each of the separate furnace chambers; substantially as described.

6. In a reversing valve system, a vertically movable water-sealed valve having an annular well, a substantially concentric stem for actuating the valve and a connection eccentric to its stem arranged to supply water to the valve well; substantially as described.

7. In a reversing valve system, a rock shaft, a pair of valves actuated thereby, each valve having an annular water well, and a depending flange, a stationary water seal to receive the valve flange, and connections eccentric to the valves and arranged to lead water into the valve wells and thence to the stationary wells for the valves said connections including stationary members with respect to which the valves move; substantially as described.

8. In a reversing valve, a vertically movable valve having a well, and means for supplying water thereto, including telescoping pipes additional to the valve stem, one of which is carried by the valve, and the other by the casing.

9. In a reversing valve, a vertically movable valve having a well, operating means for the valve connected centrally thereto, and a supply pipe for the well disposed at one side of said central connection.

10. The combination with a series of separate furnace chambers, of sets of reversing valves controlling the flow of gases separately to each chamber, operating devices for each set of valves for said separate furnace chambers, and a common operating means having severable connection with each of the operating devices; substantially as described.

11. The combination with a series of separate furnace chambers, of valves controlling the flow of gases separately to each chamber, operating devices for each of the valves for said separate furnace chambers, and a common operating means having detachable connection with each of the operating devices, the connections being adjustable to separately adjust the positions of the different valves; substantially as described.

In testimony whereof, I have hereunto set my hand.

C. P. BYRNES.

Witnesses:
R. D. LITTLE,
H. M. CORWIN.